United States Patent [19]
Felber

[11] Patent Number: 5,368,069
[45] Date of Patent: Nov. 29, 1994

[54] CONDUIT JOINT ASSEMBLY

[75] Inventor: Kevin R. Felber, Beltsville, Md.

[73] Assignee: EG&G Pressure Science, Inc., Beltsville, Md.

[21] Appl. No.: 68,676

[22] Filed: May 28, 1993

[51] Int. Cl.⁵ .............................. F16K 15/03
[52] U.S. Cl. .............................. 137/515.7; 137/512.1
[58] Field of Search ............ 137/515, 515.3, 515.5, 137/515.7, 512.1

[56] References Cited

U.S. PATENT DOCUMENTS

| | | | |
|---|---|---|---|
| 1,325,568 | 12/1919 | Leidecker | 137/515.7 |
| 2,454,072 | 11/1948 | Long | 137/515.3 |
| 3,575,432 | 4/1971 | Taylor. | |
| 3,797,836 | 3/1974 | Halling. | |
| 4,279,403 | 7/1981 | Hobson | 251/148 |
| 4,759,555 | 7/1988 | Halling. | |
| 4,779,901 | 10/1988 | Halling. | |
| 4,854,600 | 8/1989 | Halling et al.. | |
| 4,919,453 | 4/1990 | Halling et al.. | |
| 5,143,117 | 9/1992 | Klein | 137/515.7 X |
| 5,232,014 | 8/1993 | Hiltebrand | 137/515.7 |

OTHER PUBLICATIONS

Barber Colman Co., Air Valves Product Sheet, (undated).

Primary Examiner—Robert G. Nilson
Attorney, Agent, or Firm—Roylance, Abrams, Berdo & Goodman

[57] ABSTRACT

A conduit joint assembly having a pair of tubular flange members for rigidly coupling a pair of conduits together and for supporting a fluid engaging device. One of the tubular flange members has a pair of headed retaining pins for engaging a pair of retaining slots or cutouts formed in the fluid engaging device. In particular, the fluid engaging device has a radially extending flange with the retaining slots or cutouts spaced 180° apart along its periphery for engaging complementing pins of one of the tubular flange members. Specifically, the fluid engaging device is coupled to one of the tubular flange member by passing the pins through a notched portion of slot and then axially rotating the fluid engaging device relative to the tubular flange member to a locked position. A second tubular flange member is then aligned with the fluid engaging device and coupled together by the coupling assembly. Resilient spring seals are positioned between the flange of the fluid engaging device and the tubular flange members to seal the conduit joint assembly in a fluid-tight manner. The retaining pins and slots are positioned radially outwardly from the seals so as not to interfere with the sealing of the joint assembly.

22 Claims, 5 Drawing Sheets

CONDUIT JOINT ASSEMBLY

FIELD OF THE INVENTION

The present invention is directed to a conduit joint assembly for connecting two conduits together and for supporting a fluid engaging device between the ends of the conduits. More particularly, the invention relates to a retainer device on an axial end of one of the conduits for coupling with a fluid engaging device to support and position the fluid engaging device in the flow path of the conduits during assembly of the fluid engaging device within the conduits.

BACKGROUND OF THE INVENTION

There are numerous applications for ducting systems needed to carry air or other fluids to a designated area. One such use is in the aircraft industry where air is delivered to several locations and, in particular, to a gas turbine engine or auxiliary power unit. Typically, it is essential to affect sealing between the ends of conduits and to accurately align the ends of the conduits. Resilient sealing rings are often used to seal against the opposing axial faces of the conduits. The conduits are then coupled together by a clamping system which is typically a V-shaped clamping ring and tightening bolt arrangement to apply radially inward clamping forces and draw the opposing faces of the conduits together.

In the aircraft industry, as well as many other fields, it is often desirable to include a fluid engaging device, such as, for example, a flow restrictor, check valve, or fluid sensor, in the flow path within the conduits. These fluid engaging devices often include an annular flange that is clamped between ends of the conduits to position the devices in the flow path of the conduits. The assembly of the conduit sections in a manner to obtain a fluid tight seal while supporting the fluid engaging device can be very difficult. It is critical to properly align the fluid engaging device with the axial face of conducts to ensure a proper seal.

In many applications, it is difficult to align and properly support the fluid engaging devices on the axial face of a conduit while attempting to couple to an adjacent conduit. For example, in the aircraft industry, air supply ducts are often located in crowded areas, and thus, do not provide sufficient room for the worker to effectively support and align the fluid engaging device during assembly of the duct sections. It is particularly difficult to support and align fluid engaging devices where the ducts are located overhead and oriented vertically. The fluid engaging device often moves during assembly of the duct sections thereby preventing an effective seal and necessitating disassembly and reassembly of the joint. This results in lost time and lower production levels.

Accordingly, there is a continuing need in the art for improvements in conduit joint assemblies where a fluid tight seal is important, for example, in aircraft conduit systems having high pressure and temperature fluids which have a fluid engaging device in the flow path of the conduit. In addition, there is a continuing need for a joint assembly for conduits that is able to quickly and accurately align a fluid engaging device on an axial face of a conduit.

SUMMARY OF THE INVENTION

Accordingly, a primary object of the invention is to provide a conduit joint assembly including a fluid engaging device that can be quickly and easily assembled and disassembled.

Another object of the invention is to provide a conduit joint assembly with one of the conduits having a retainer for supporting and aligning a fluid engaging device while assembling the remainder of the joint regardless of conduit orientation.

Specifically, the object of the current invention is to provide a conduit joint assembly having a retaining device associated with one section of the pipe and with the fluid engaging device to support the fluid engaging device in an overhead vertically oriented position.

Another object of the invention is to provide a conduit joint assembly with one of the conduits having a retaining device for a fluid engaging device that does not interfere with the sealing of the conduit joint assembly.

Another object of the invention is to provide a conduit joint assembly having a retaining device associated with the fluid engaging device for aligning the fluid engaging device in the flow path of the pipe during assembly.

The foregoing objects are basically attained by providing a first tubular flange member adapted to be fixedly coupled to a first conduit; a second tubular flange member adapted to be fixedly coupled to a second conduit; a fluid engaging device positioned between said first and second tubular flange members; a retaining device associated with the first tubular flange member and the fluid engaging device for coupling said fluid engaging device to the first tubular flange member; a seal positioned between the fluid engaging device and the first and second tubular flange members for sealing between the fluid engaging device and the first and second tubular flange members; and a coupling assembly for coupling said first and second tubular flange members together.

The foregoing objects are also obtained by providing a coupling assembly, the combination comprising: a first conduit having a first annular axial face, and a fluid flow path therethrough; a fluid engaging device to be positioned in the fluid flow path, and having a slot for mating with the annular axial face; and a retaining device associated with the first axial face and the slot for coupling the fluid engaging device to the first conduit.

Other objects, advantages and salient features of the present invention will become apparent from the following detailed description, which, taken in conjunction with the annexed drawings, discloses preferred embodiments of the invention.

BRIEF DESCRIPTION OF THE DRAWINGS

Referring now to the drawings which form a part of this original disclosure.

DETAILED DESCRIPTION OF THE INVENTION

Referring now to FIGS. 1–9, a conduit joint assembly 10 in accordance with the present invention is shown for axially coupling a first conduit section 12 to a second conduit section 14. Conduit sections 12 and 14 are preferably rigid, metallic pipes. Conduit joint assembly 10 includes a fluid engaging device 16, a coupling device 18 for clamping conduit sections 12 and 14 together, a pair of resilient E-seals 20 and 22 positioned between the fluid engaging device 16 and conduit sections 12 and 14, respectively, a female tubular flange member 24 fixedly coupled to first conduit section 12, and a male tubular flange member 48 fixedly coupled to second conduit section 14.

Conduit sections 12 and 14 are typically cylindrical and formed of high-temperature resistant metal and define a fluid flow path for receiving a fluid therethrough. For example, in an air supply for an auxiliary power unit in aircraft, the conduit is about 4.0 inches in diameter and is made from stainless steel such as Stainless Steel 321.

Figure 1:
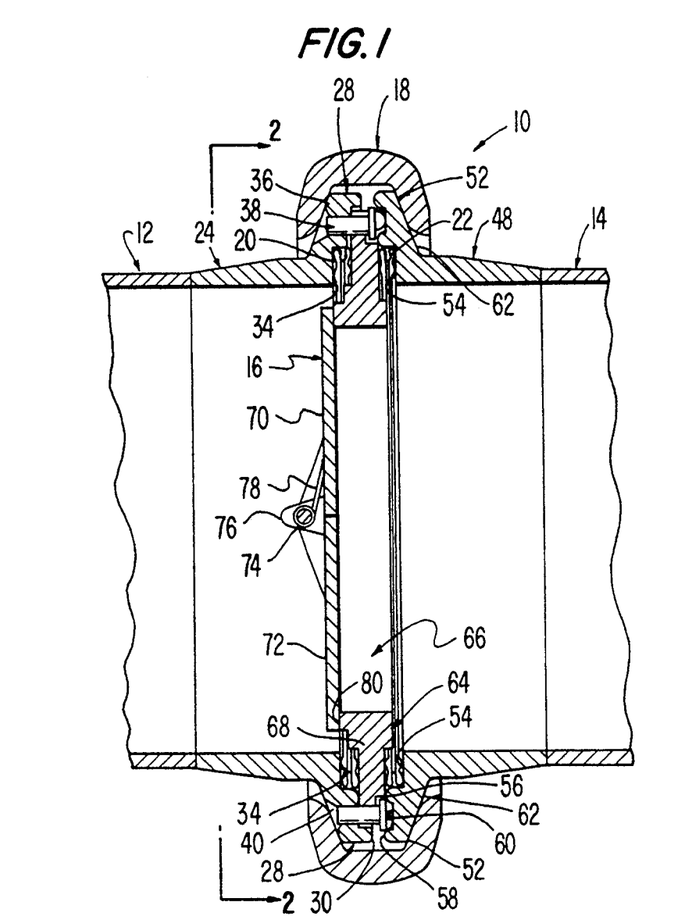
FIG. 1 is a partial, longitudinal cross-sectional view of the assembled conduit joint assembly and fluid engaging device in accordance with the present invention.
Figure 9:
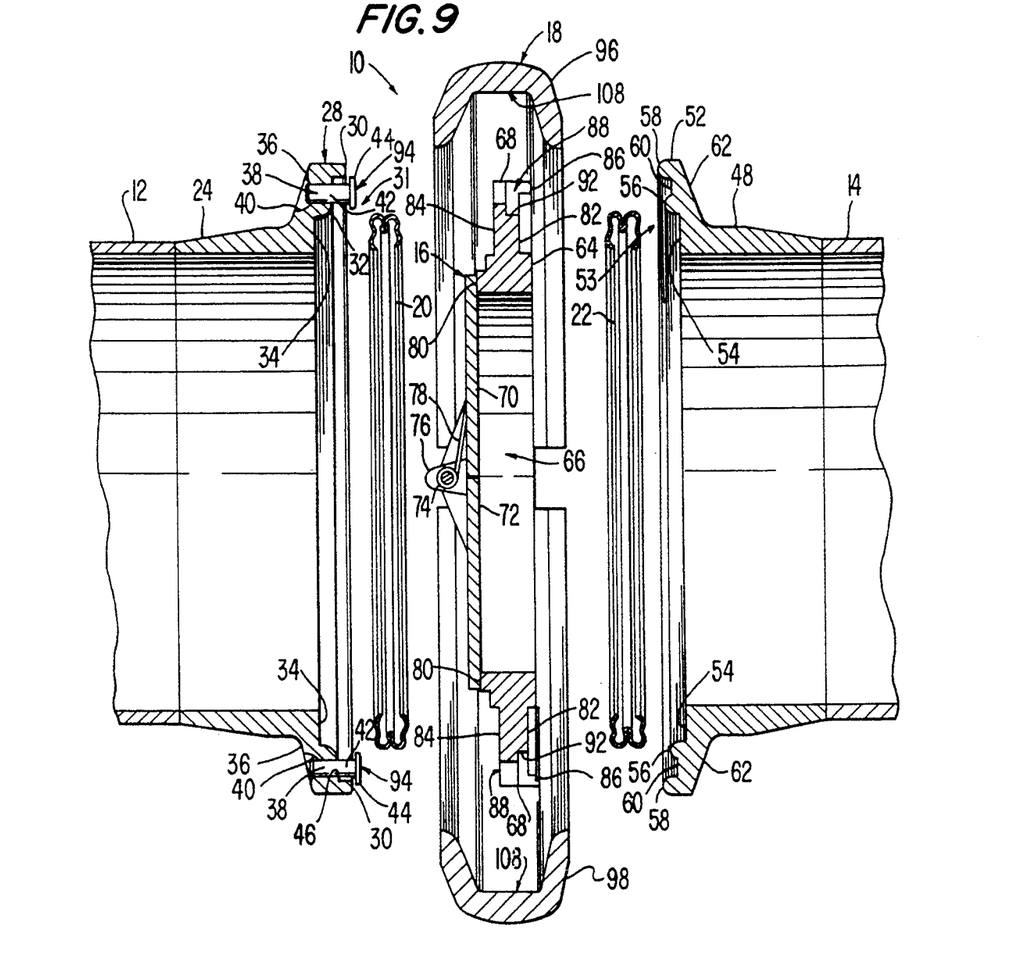
FIG. 9 is an exploded, partial, side elevational view of the conduit joint assembly shown in FIGS. 1–8.

First conduit section 12, as seen in FIGS. 1 and 9, is rigidly coupled to female flange member 24 by welding or by other suitable means. Female flange member 24 includes an annular flange 28 extending radially, outwardly therefrom and defining an annular axially extending face 31. The peripheral edge of flange 28 is provided with an annular lip 30 extending axially from flange 28 and concentric with female flange member 24.

An annular planar portion 32 is provided inwardly from annular lip 30 for mating with fluid engaging device 16. Planar portion 32 is positioned perpendicular to the axis of female flange member 24. An annular recess 34 is provided inwardly from the planar portion 32 for receiving a seal 20. As seen in FIG. 1, lip 30, planar portion 32 and annular recess 34 define axial face 31 of female flange member 24. Planar portion 32 and the bottom wall of recess 34 are substantially parallel to each other and are perpendicular to the axis of female flange member 24. Flange 28 further includes an annular, inclined surface 36 opposite planar portion 32 for mating with coupling device 18.

Female flange member 24 includes a retaining device for coupling fluid engaging device 16 to axial face 31 of female flange member 24 during assembly. The retaining device in this embodiment includes two retaining pins 38 positioned 180° apart on flange 28. Retaining pins 38 have a shaft 42 and a head 44. Head 44 of pins 38 is a flat circular member having a diameter larger than the diameter of shaft 42. The shafts 42 of the pins 38 are received in a bore 46 extending axially through flange 28 such that the pin extends from axial face 31 of female flange member 24. Preferably, the shafts 42 of pins 38 are press fitted into the bores 46 and then welded in recessed area 40 on the inclined face 36 opposite axial face 31 of the female flange member 24. It is particularly important to weld shafts 42 of pins 38 to flange 28 in recessed area 40 of flange 28 in a manner so that the weld does not protrude beyond the inclined surface 36 so as not to interfere with the clamping of female flange member 24 by coupling device 18.

Figure 2:
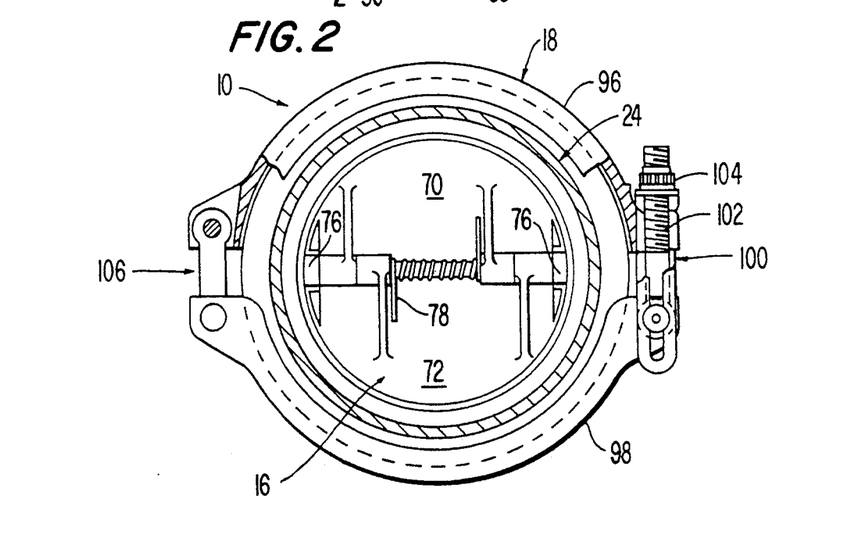
FIG. 2 is an end elevational view of the conduit joint assembly taken along line 2—2 in FIG. 1.
Figure 3:
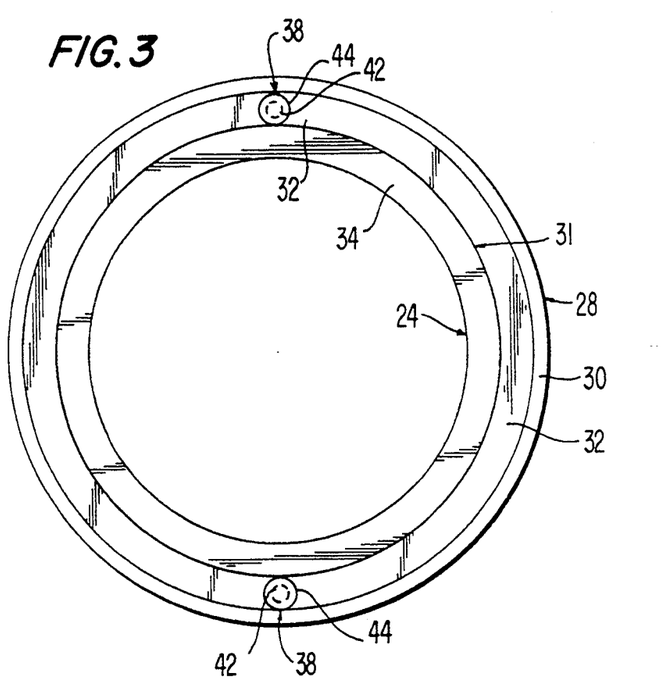
FIG. 3 is an end elevational view of the female flange member of the conduit joint assembly of FIG. 1.

In the embodiment of FIGS. 1–9, retaining pins 38 are fixedly coupled about 180° apart on flange 28. Retaining pins 38 are also positioned in the planar portion 32 of the axial face such that pins 38 are disposed outside of the flow path of the fluid, i.e., disposed radially outwardly of annular recess 34 and seal 20 as shown in FIG. 3. In this manner, retaining pins 38 do not interfere with the fluid flow or the sealing of the female flange member 24 to fluid engaging device 16.

In the illustrated embodiment, only two retaining pins 38 are shown. In practice, the number of retaining pins used may be more or less depending on the size of the tubular flange and the fluid engaging device. Retaining pins 38 are preferably made from a harder material than the female flange member 24 to resist breakage. Suitable materials for pins 38 include stainless steel, such as Stainless Steel 321, Custom 450 or INCONEL.

Figure 4:
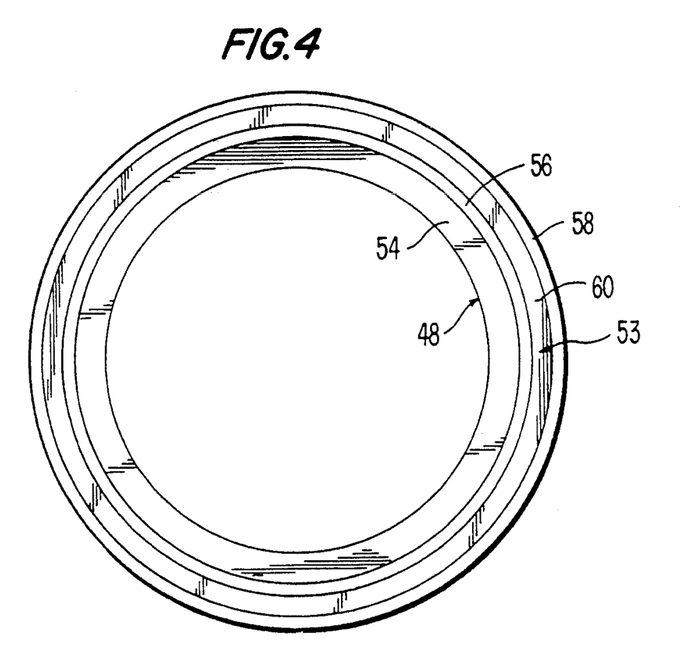
FIG. 4 is an end elevational view of the male flange member of the conduit joint assembly of FIG. 1.
Figure 5:
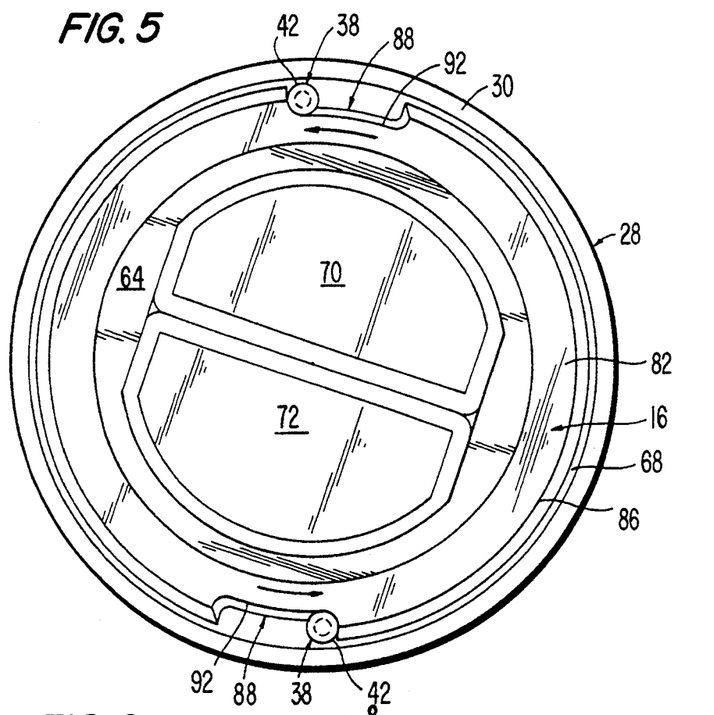
FIG. 5 is an end elevational view of the female flange member with the fluid engaging device positioned on the axial face of the female flange member in the unlocked position.
Figure 6:
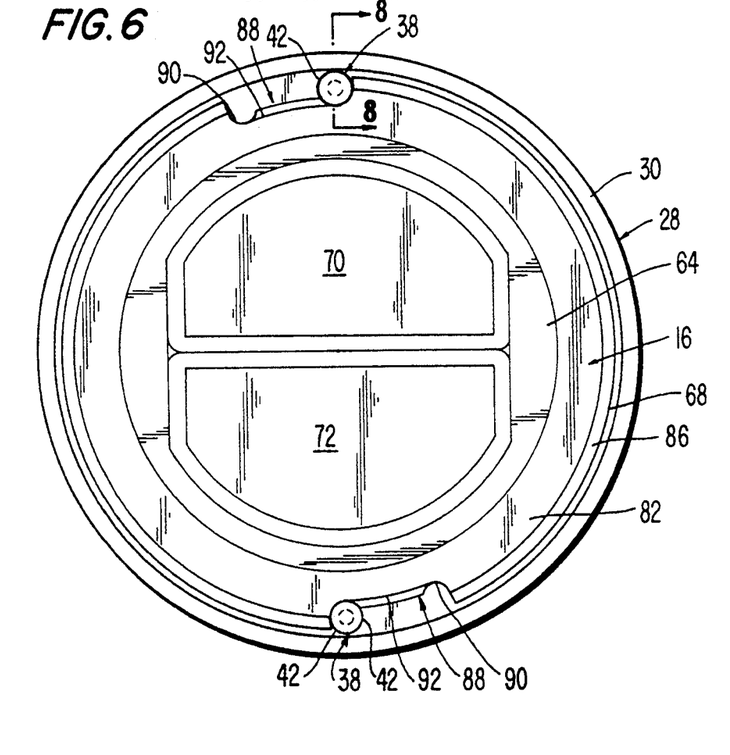
FIG. 6 is an end elevational view of the female flange member and the fluid engaging device coupled to the axial face of the female flange member in the locked position.

Second conduit 14 is coupled to male tubular flange member 48 by welding or some other suitable means. Male flange member 48 includes a radially extending flange 52 having an axial face 53. Axial face 53 has an annular inner recess 54 complementary to annular recess 34 of the female flange member 24 and a pair of annular, concentrically arranged lips 56 and 58 extend axially from radial flange 52. Lips 56 and 58 are spaced apart by an annular planar portion 60 spaced outwardly from annular recess 54 as shown in FIG. 4. The base of annular recess 54 and annular planar portion 60 are substantially perpendicular to the axis of male flange member 48. Radial flange 52 also includes an inclined surface 62 facing opposite axial face 53.

As shown in FIG. 1, when the conduit joint assembly 10 is in the assembled condition, annular recess 54 of male flange member 48 is opposite annular recess 20 of female flange member 24 and outer annular lip 58 of male flange member 48 opposes outer lip 30 of female flange member 24.

In the embodiment of FIGS. 1–9, fluid engaging device 16 is preferably a check valve assembly comprising a body portion 64 having a central flow path opening 66 therethrough and an annular flange 68 extending outwardly from body portion 64. Alternatively, any desirable device may be mounted between the axial faces of the tubular flanges, such as, for example, a flow restrictor, orifice plate, fluid measuring device or fluid sensing device.

In this embodiment, the check valve 16 includes a pair of hinged valve plates 70 and 72 pivotally mounted on a shaft 74. Shaft 74 is pivotally coupled to body portion 64 by a pair of supports 76. A coil spring 78 is also mounted on shaft 74 to bias valve plates 70 and 72 in the closed position against the valve seat 80 of body portion 64 as shown in FIG. 1. Valve plates 70 and 72 are pressure operated in a conventional manner, and thus, will not be discussed or illustrated in detail. An example of a check valve operating in a similar manner is manufactured by Barber Colman Aircraft Products Division of Barber Colman Company. The check valve is typically made of stainless steel and capable of withstanding operating temperatures of 700° F. and pressures of 120 psi.

Figure 7:
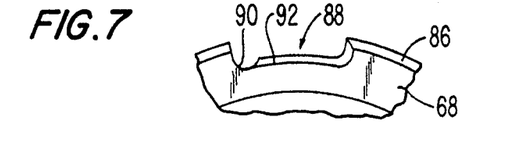
FIG. 7 is a partial, side elevational view of the fluid engaging device showing the outer flange and the slot for coupling with the retaining device on the axial face of the female flange member.

As seen in FIGS. 1 and 7, flange 68 of fluid engaging device 16 extends radially from body portion 64 to mate with the axial faces of flange members 24 and 48. Flange 68 includes opposing sides 82 and 84 facing axially in opposite directions for mating with seals 20 and 22. An annular lip 86 extends around the peripheral edge of the flange 68 and extends axially with respect to the flow path or opening 66. In preferred embodiments, annular lip 86 is dimensioned to mate with annular portion 60 of axial face 53 of male flange member 48.

Referring to FIG. 7, flange 68 of fluid engaging device 16 includes a pair of pin retaining slots 88 located 180° apart for mating with retaining pins 38 of female flange member 24. As shown, retaining slots 88 are formed in the peripheral edge and extend along an arcuate section of flange 68. In preferred embodiments, each of the slots 88 has an arcuate length extending about 20° along the periphery of flange 68, and includes a notched portion 90 at one end and a counterbored recessed area 92 extending arcuately along the remaining length of the slot 88.

Figure 8:
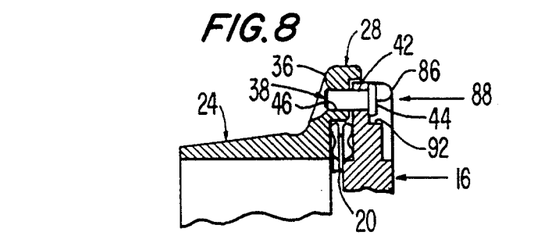
FIG. 8 is a partial, side cross-sectional view of the female flange member showing the retaining pin coupled within the slot of the flange of the fluid engaging device and the seal positioned between the flange and the fluid engaging device.

Notched portions 90 of retaining slots 88 are dimensioned to axially receive the heads 44 of retaining pins 38 therethrough. Recessed areas 92 have a depth and width complementing the thickness and width of the heads 44 of retaining pins 38 such that the heads 44 mate with the recessed areas 92 and the axial faces 94 of heads 44 of pins 38 lie substantially flush with the axial face of flange 68 when assembled as shown in FIG. 1. Retaining pins 38 extend outwardly a distance from flange 28 slightly greater than the thickness of flange 68 along slots 88 of the fluid engaging device as shown in FIG. 8. Accordingly, fluid engaging device 16 is releasably coupled to female flange member 24 by first inserting fluid engaging device 16 over pins 38 by means of notched portions 90 of retaining slots 88, and then rotating fluid engaging device 16 so that shafts 42 of pins 38 slide along the peripheral edge of slots 88 with heads 44 received in recessed areas 92.

Seals 20 and 22 are preferably a solid annular ring made of INCONEL or other suitable material. Seals 20 and 22 are generally torsionally flexible and capable of accepting radial expansion and contraction due to temperature changes without losing their elasticity. In the embodiment shown, seals 20 and 22 have a substantially E-shaped transverse cross-section. The outer arms of the E-seals have a sinuous configuration and define the sealing surfaces of the seal against the mating surfaces of fluid engaging device 16 and flange members 24 and 48. In preferred embodiments, seals 20 and 22 are formed slightly out of round to provide a snap fit into annular recesses 34 and 54 of flange members 24 and 48. The snap fit retains seals 20 and 22 in place regardless of the flange orientation during assembly of the conduit joint assembly 10. Examples of suitable seals are disclosed in U.S. Pat. No. 3,575,432 to Taylor, U.S. Pat. No. 4,759,555 to Halling, U.S. Pat. No. 4,854,600 to Halling et al., and U.S. Pat. No. 4,779,901 to Halling. The description of these spring seals as disclosed in these patents are hereby incorporated herein by reference. In alternative embodiments, the spring seal may be a multiply seal assembly comprising first and second annular members nested together. An example of this type of spring seal is disclosed in commonly assigned co-pending application Ser. No. 08/004,660, filed Jan. 14, 1993 now U.S. Pat. No. 5,249,814.

Referring to FIG. 2, coupling assembly 18 is shown comprising a pair of substantially semicircular V-shaped clamp members 96 and 98, a pivot assembly 106 pivotally connecting a pair of adjacent ends of clamp members 96 and 98. A locking assembly 100 is provided at the opposite ends of clamp members 96 and 98 for applying a clamping force therebetween. Locking assembly 100 includes a tightening bolt 102 threadedly receiving a threaded nut 104 for drawing the clamp members 96 and 98 together in the radially inward direction. As seen in FIG. 1 and FIG. 9, the interior of clamp members 96 and 98 have an inwardly opening inverted V-shaped groove 108. The walls of V-shaped groove 108 engage inclined surfaces 36 and 62 on flange members 24 and 48 to force flange members 24 and 48 together as clamp members 96 and 98 are moved toward each other by the locking assembly 100. Coupling assembly 18 encircles the entire periphery of the flanges 28 and 52.

By tightening the clamp members 96 and 98, coupling assembly 18 compresses flanges 28 and 52 radially inwardly and axially against flange 68 of fluid engaging device 16 to prevent relative angular movement therebetween. Coupling assembly 18 may be made from a number of suitable materials such as, for example, INCONEL and Stainless Steel 303 and 304. Examples of this type of coupling assembly are disclosed in U.S. Pat. No. 3,797,836 to Halling and U.S. Pat. No. 4,779,901, the disclosures of which are hereby incorporated herein by reference.

INSTALLATION OF A CONDUIT JOINT ASSEMBLY

In installing the conduit joint assembly 10 in accordance with the invention shown in FIG. 1, flange members 24 and 48 are welded to conduit sections 12 and 14. Then E-shaped seal 20 is then snap fitted into the recess 34 of the axial face 31 of the female flange member 24, while E-shaped seal 22 is similarly placed in the recess 54 in the axial face 53 of the male flange member 48. Since the E-shaped seals 20 and 22 are slightly out of round, the resilience of the seals enables the outer edges of seals 20 and 22 to engage flange members 24 and 48 to retain the seals in place. Fluid engaging device 16 is then coupled to female flange member 24 by moving device 16 axially toward flange member 24 such that the heads 44 of pins 38 pass through notches 90 in flange 68 as substantially shown in FIG. 5. Fluid engaging device 16 is then axially rotated relative to flange member 24 to the position shown in FIG. 6 such that the head 44 of pins 38 engage the counterbored recessed area 92 of retaining slots 88.

In preferred embodiments, the E-shaped seal 20 is dimensioned to bias the fluid engaging device 16 away from flange member 24 such that the recessed areas 92 of retaining slots 88 engage the heads 44 of pins 38 with sufficient tension to retain fluid engaging device 16 in place during assembly substantially as shown in FIG. 8. The spring action of seal 20 retains fluid engaging device 16 in the desired position on the axial face of the female flange member 24 during installation of conduit joint assembly 10.

After male flange member 48 is mated with fluid engaging device 16, clamp members 96 and 98 are then maneuvered around flanges 28 and 52. The clamp members 96 and 98 are moved towards one another by tightening nut 104 on bolt 102 of locking assembly 100. Once the walls defining the grooves 108 of clamp members 96 and 98 engaged the inclined surfaces 36 and 62 of flanges 28 and 52, conduit sections 12 and 14 are rigidly coupled together to resist relative axial movement therebetween. Further tightening of the locking assembly 100 urges flange members 24 and 48 toward one another and against flange 68 of fluid engaging device 16 to compress the E-shaped seals 20 and 22 and form a fluid tight seal therebetween. In the fully tightened position, flange 68 of fluid engaging device 16 mates with annular face 31 of female flange member 24 and annular lip 86 of flange 68 mates with annular recess 60 of male flange member 48 as shown in FIG. 1.

The structural relationship of the fluid engaging device 16 and the female flange 24 prevent fluid engaging device 16 from being coupled to the female flange backwards, thus assuring proper assembly of the joint. The pins 38 extend from axial face 31 of female flange 24 a distance slightly less than the thickness of flange 68 of fluid engaging device 16 so that heads 42 of pins 38 are seated in recess 92 of flange 68. This feature prevents fluid engaging device 16 from being inadvertently coupled to female flange 24 in the opposite direction since heads 42 of pins 38 will not align with recess 92 to allow rotation and locking of fluid engaging device 16. Moreover, axial lip 86 of fluid engaging device 16 will engage annular area 32 of female flange 24 and thereby space flange 68 beyond the reach of pins 38 to prevent pins 38 from engaging slots 88. When reversed, flange 68 will not properly mate with tubular flanges 24 and 48 such that coupling 18 cannot be latched.

In an alternative embodiment of the invention, the fluid engaging device 16 could be provided with two closed, key shaped apertures instead of the slot in the peripheral edge. Each of the closed key shaped apertures includes a round portion complementing the dimension of the head 44 of one of the retaining pins 38 to permit the head 44 to pass therethrough and an elongated, arcuate section dimensioned to receive the shaft 42 of one of the retaining pins 38.

EMBODIMENT OF FIGS. 10 AND 11

Figure 10:
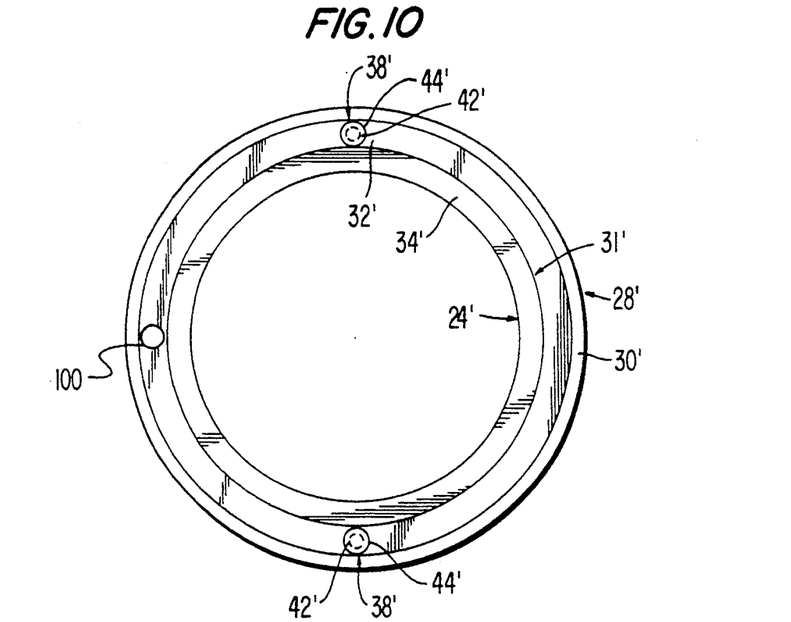
FIG. 10 is an end elevational view of the female flange in an alternative embodiment of the invention showing the third pin extending from the axial face of the female flange.
Figure 11:
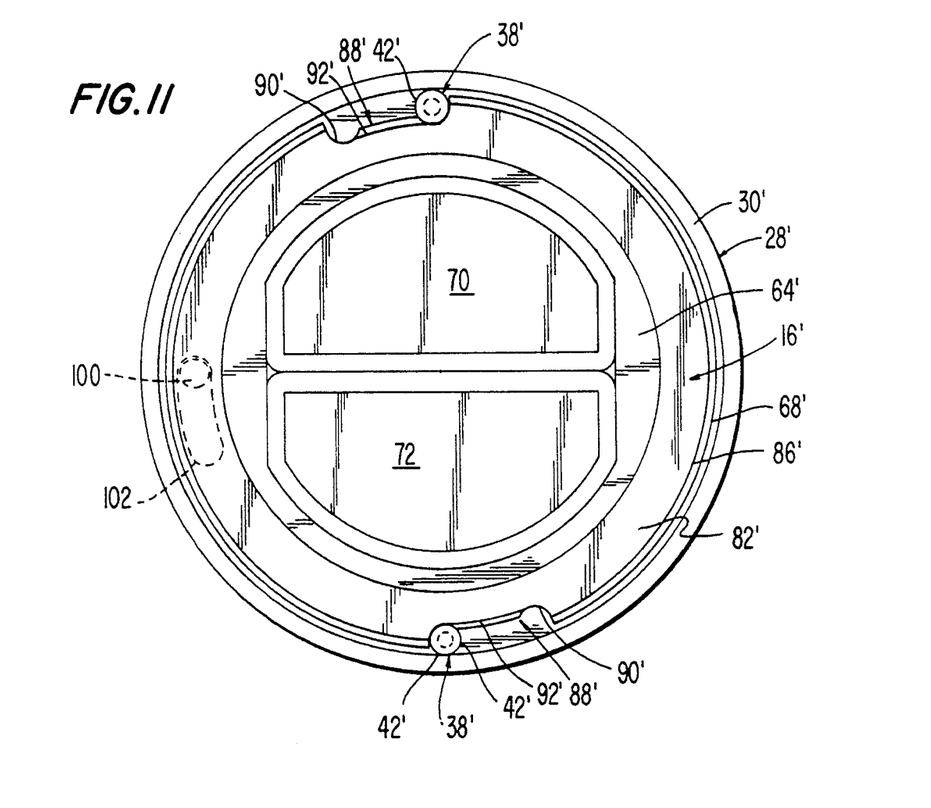
FIG. 11 is an end elevational view of the fluid engaging device coupled to the female flange of the embodiment of FIG. 10.

In a further embodiment of the invention illustrated in FIGS. 10 and 11, a fluid engaging device 16' and female flange 24' include an assembly to ensure proper orientation and coupling of fluid engaging device 16' and female flange 24'. The structure and operation of female flange 24' and fluid engaging device 16' are similar to the embodiment of FIGS. 1-9 and, thus, like elements are designated by the same reference number with the addition of a prime.

Referring to FIG. 10, female flange 24' includes a pin 100 extending axially from planar portion 32'. Pin 100 comprises a cylindrical shaft and is preferably positioned about 90° from each of pins 38' and spaced from the center of female flange 24' the same distance as pins 38'. The length of pin 100 is preferably less than the thickness of flange 68' of fluid engaging device 16'. Flange 68' of fluid engaging device 16' includes an arcuate recess 102 in the face opposing female flange 24'. Pin 100 and recess 102 are dimensioned to cooperate with each other such that pin 100 slides in recess 102 when fluid engaging device 16' is rotated with respect to female flange 24'. Recess 102 is positioned only on one side of flange 68' so that fluid engaging device 16' can only be coupled to female flange 24' with pin 100 received in recess 102, thereby preventing fluid engaging device 16' from inadvertently being improperly coupled.

While several embodiments have been chosen to illustrate the invention, it will be understood by those skilled in the art that various changes and modifications can be made therein without departing from the scope of the invention as defined in the appended claims.

What is claimed is:

1. A conduit joint assembly comprising:
    a first tubular flange member adapted to be fixedly coupled to a first conduit;
    a second tubular flange member adapted to be fixedly coupled to a second conduit;
    a fluid engaging device positioned between said first and second tubular flange members;
    non-threaded retaining means, associated with said first tubular flange member and said fluid engaging device, for coupling said fluid engaging device to said first tubular flange member within less than one complete revolution therebetween such that said retaining means allows limited axial movement between said first tubular flange member and said fluid engaging device without rotational movement therebetween when coupled together;
    sealing means, positioned between said fluid engaging device and said first and second tubular flange members, for sealing between said fluid engaging device and said first and second tubular flange members, said sealing means including a first resilient seal disposed between said first flange member and said fluid engaging device for biasing said fluid engaging device away from said first flange member; and
    coupling means for coupling said first and second tubular flange members together.

2. A conduit joint assembly of claim 1, wherein
    each of said first and second flange members includes an annular sealing portion for mating with said seal means.

3. A conduit joint assembly of claim 1, wherein
    said retaining means is disposed radially outward from said sealing means.

4. A conduit joint assembly comprising:
    a first tubular flange member adapted to be fixedly coupled to a first conduit;
    a second tubular flange member adapted to be fixedly coupled to a second conduit;
    a fluid engaging device positioned between said first and second tubular flange members;
    retaining means, associated with said first tubular flange member and said fluid engaging device, for coupling said fluid engaging device to said first tubular flange member, said retaining means including a retaining pin and a retaining slot for engaging said retaining pin;
    sealing means, positioned between said fluid engaging device and said first and second tubular flange members, for sealing between said fluid engaging device and said first and second tubular flange members; and
    coupling means for coupling said first and second tubular flange members together.

5. A conduit joint assembly of claim 4, wherein said retaining means includes a pair of said pins spaced about 180° apart and a pair of said slots.

6. A conduit joint assembly of claim 5, wherein said fluid engaging device includes a radially extending flange with said slots being formed therein.

7. A conduit joint assembly of claim 6, wherein each of said pins having a shaft with a head fixedly coupled thereto, and each of said slots include a recessed area for receiving one of said heads of said pins.

8. A conduit joint assembly of claim 7, wherein each of said slots include notch means for axially receiving one of said heads of said pins.

9. A conduit joint assembly of claim 8, wherein said fluid engaging device is a check valve.

10. A conduit joint assembly of claim 8, wherein said sealing means comprises a first resilient spring seal disposed between said first flange member and said fluid engaging device, said resilient spring seal biasing said fluid engaging device axially away from said first flange member.

11. A conduit joint assembly comprising:
a first tubular flange member adapted to be fixedly coupled to a first conduit;
a second tubular flange member adapted to be fixedly coupled to a second conduit;
a fluid engaging device positioned between said first and second tubular flange members;
retaining means, associated with said first tubular flange member and said fluid engaging device, for coupling said fluid engaging device to said first tubular flange member, said retaining means including a pin having a shaft extending axially from said first tubular flange and a head fixedly coupled on a distal end of said shaft with a diameter greater than said shaft;
sealing means, positioned between said fluid engaging device and said first and second tubular flange members, for sealing between said fluid engaging device and said first and second tubular flange members; and
coupling means for coupling said first and second tubular flange members together.

12. A coupling assembly, the combination comprising:
a first conduit having a first annular axial face, and a fluid flow path therethrough, said first conduit being adapted for coupling with a complementary second conduit;
a fluid engaging device with a flange for mating with said annular axial face to position said fluid engaging device in said fluid flow path; and
non-threaded retaining means, associated with said fist axial face and said flange, for coupling said fluid engaging device to said first conduit within less than one complete revolution therebetween such that said retaining means allows limited axial movement between said first conduit and said fluid engaging device without rotational movement therebetween when coupled together.

13. A coupling assembly of claim 12, further comprising
a second conduit having a second annular axial face, and a fluid flow path therethrough, said flange mating with said second axial face.

14. A coupling assembly, the combination comprising:
a first conduit having a first annular axial face, and a fluid flow path therethrough, said first conduit being adapted for coupling with a complementary second conduit;
a fluid engaging device with a flange for mating with said annular axial face to position said fluid engaging device in said fluid flow path; and
retaining means, associated with said first axial face and said flange, for coupling said fluid engaging device to said first conduit,
said retaining means associated with said first axial face including at least one pin with an enlarged head at a distal end thereof, and
said retaining means associated with said mating means including at least one slot for mating with said at least one pin.

15. A coupling assembly of claim 14, wherein said at least one slot includes means for locking said fluid engaging device to said first axial face by axially rotating said fluid engaging device with respect to said first conduit.

16. A coupling assembly of claim 15, wherein said at least one slot includes a recess for engaging said head of said at least one pin; and
said recess includes a notch to allow said head to pass axially therethrough.

17. A coupling assembly of claim 12, further comprising
sealing means positioned between said fluid engaging device and said first axial face.

18. A coupling assembly of claim 12, wherein said fluid engaging device is a check valve.

19. A coupling assembly of claim 12, wherein said flange comprises means for coupling said fluid engaging device to said first axial face by axial rotation of said fluid engaging device relative to said axial face.

20. A coupling assembly of claim 14, wherein said retaining means associated with said first axial face includes two headed retaining pins extending therefrom; and
said retaining means associated with said fluid engaging device comprises two slots for mating with said pins by axial rotation of said fluid engaging device relative to said first conduit.

21. A coupling assembly of claim 12, wherein said first axial face includes a pin extending axially therefrom; and
said flange of said fluid engaging device includes an arcuate recess for mating with said pin to ensure correct orientation of said fluid engaging deice relative said fist conduit.

22. A coupling assembly, the combination comprising:
a first conduit having a first annular axial face, and a fluid flow path therethrough, said first conduit being adapted for coupling with a complementary second conduit;
a fluid engaging device with a flange for mating with said annular axial face to position said fluid engaging device in said fluid flow path; and
retaining means, associated with said first axial face and said flange, for coupling said fluid engaging device to said conduit via rotation, said retaining means including a retaining pin and an elongated retaining slot for engaging said retaining pin to allow limited relative rotational movement therebetween.

* * * * *